(12) United States Patent
Kaida

(10) Patent No.: US 10,863,044 B2
(45) Date of Patent: Dec. 8, 2020

(54) INFORMATION PROCESSING APPARATUS, INFORMATION PROCESSING SYSTEM, AND METHOD OF PROCESSING INFORMATION

(71) Applicant: Yukiko Kaida, Kanagawa (JP)

(72) Inventor: Yukiko Kaida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/161,183

(22) Filed: Oct. 16, 2018

(65) Prior Publication Data

US 2019/0132459 A1 May 2, 2019

(30) Foreign Application Priority Data

Oct. 31, 2017 (JP) .................................. 2017-211044

(51) Int. Cl.
*H04N 1/00* (2006.01)

(52) U.S. Cl.
CPC ..... *H04N 1/00509* (2013.01); *H04N 1/00424* (2013.01)

(58) Field of Classification Search
CPC .............. H04N 1/00509; H04N 1/00424
See application file for complete search history.

(56) References Cited

U.S. PATENT DOCUMENTS

| | | | |
|---|---|---|---|
| 7,451,404 B1 * | 11/2008 | Kirkpatrick | G06F 16/26 715/780 |
| 2002/0122061 A1 * | 9/2002 | Martin, Jr. | G06F 9/451 715/762 |
| 2005/0270565 A1 * | 12/2005 | Shima | H04N 1/00915 358/1.15 |
| 2008/0141148 A1 * | 6/2008 | Ogita | H04N 1/00464 715/762 |
| 2009/0063136 A1 | 3/2009 | Kaida | |
| 2013/0314299 A1 | 11/2013 | Kaida | |
| 2014/0223570 A1 | 8/2014 | Matsushima et al. | |
| 2015/0015909 A1 | 1/2015 | Kaida | |
| 2016/0028907 A1 * | 1/2016 | Kato | H04N 1/00514 358/1.13 |
| 2016/0248921 A1 | 8/2016 | Niwa | |
| 2018/0041650 A1 | 2/2018 | Takahashi | |

FOREIGN PATENT DOCUMENTS

JP 2016-157156 9/2016

* cited by examiner

*Primary Examiner* — Ibrahim Siddo
(74) *Attorney, Agent, or Firm* — Oblon, McClelland, Maier & Neustadt, L.L.P.

(57) ABSTRACT

An information processing apparatus includes circuitry configured to acquire configuration information of a screen displayable on a partner apparatus connectable with the information processing apparatus via a network, acquire layout information indicating a layout state of one or more display elements arrangeable on the screen from the acquired configuration information, acquire layout template information defining the layout state of one or more display elements, edit the layout state of at least a part of the one or more display elements defined in the acquired layout template information to generate edited layout template information, and change the acquired layout information based on the edited layout template information.

20 Claims, 18 Drawing Sheets

FIG. 11

ICON LAYOUT TEMPLATE INFORMATION

| TEMPLATE NAME: CLASSIC UI TEMPLATE ||
|---|---|
| ICON NAME | DISPLAY STATUS |
| Address Management | NON-DISPLAY |
| Copier(Classic) | DISPLAY |
| Document Server | DISPLAY |
| Fax(Classic) | DISPLAY |
| Printer(Classic) | DISPLAY |
| Simple Copy | NON-DISPLAY |
| Simple Fax | NON-DISPLAY |
| Simple Scanner | NON-DISPLAY |
| Scanner(Classic) | DISPLAY |
| Web Browser | NON-DISPLAY |

FIG. 12

ICON LAYOUT INFORMATION INCLUDED IN
SCREEN CONFIGURATION INFORMATION

| ICON NAME | DISPLAY STATUS |
|---|---|
| Address Management | NON-DISPLAY |
| Copier(Classic) | NON-DISPLAY |
| Document Server | DISPLAY |
| Fax(Classic) | NON-DISPLAY |
| Printer(Classic) | DISPLAY |
| Simple Copy | DISPLAY |
| Simple Fax | DISPLAY |
| Simple Scanner | DISPLAY |
| Scanner(Classic) | NON-DISPLAY |
| Web Browser | DISPLAY |

FIG. 13

ICON LAYOUT COMPARISON SCREEN

APPLICATION LIST — G200

| ICON NAME | Before | After |
|---|---|---|
| Address Management | NON-DISPLAY | NON-DISPLAY |
| Copier(Classic) | NON-DISPLAY | DISPLAY |
| Document Server | DISPLAY | DISPLAY |
| Fax(Classic) | NON-DISPLAY | DISPLAY |
| Printer(Classic) | DISPLAY | DISPLAY |
| Simple Copy | DISPLAY | NON-DISPLAY |
| Simple Fax | DISPLAY | NON-DISPLAY |
| Simple Scanner | DISPLAY | NON-DISPLAY |
| Scanner(Classic) | NON-DISPLAY | DISPLAY |
| Web Browser | DISPLAY | NON-DISPLAY |

G210 (table region)

G220 — EDIT

Cancel    OK — G230

FIG. 15

CHANGED ICON LAYOUT INFORMATION

| ICON NAME | DISPLAY STATUS |
|---|---|
| Address Management | NON-DISPLAY |
| Copier(Classic) | DISPLAY |
| Document Server | DISPLAY |
| Fax(Classic) | DISPLAY |
| Printer(Classic) | DISPLAY |
| Simple Copy | NON-DISPLAY |
| Simple Fax | NON-DISPLAY |
| Simple Scanner | NON-DISPLAY |
| Scanner(Classic) | DISPLAY |
| Web Browser | DISPLAY |

LAYOUT OF ICONS BEFORE CHANGING
SCREEN CONFIGURATION INFORMATION

LAYOUT OF ICONS AFTER CHANGING
SCREEN CONFIGURATION INFORMATION

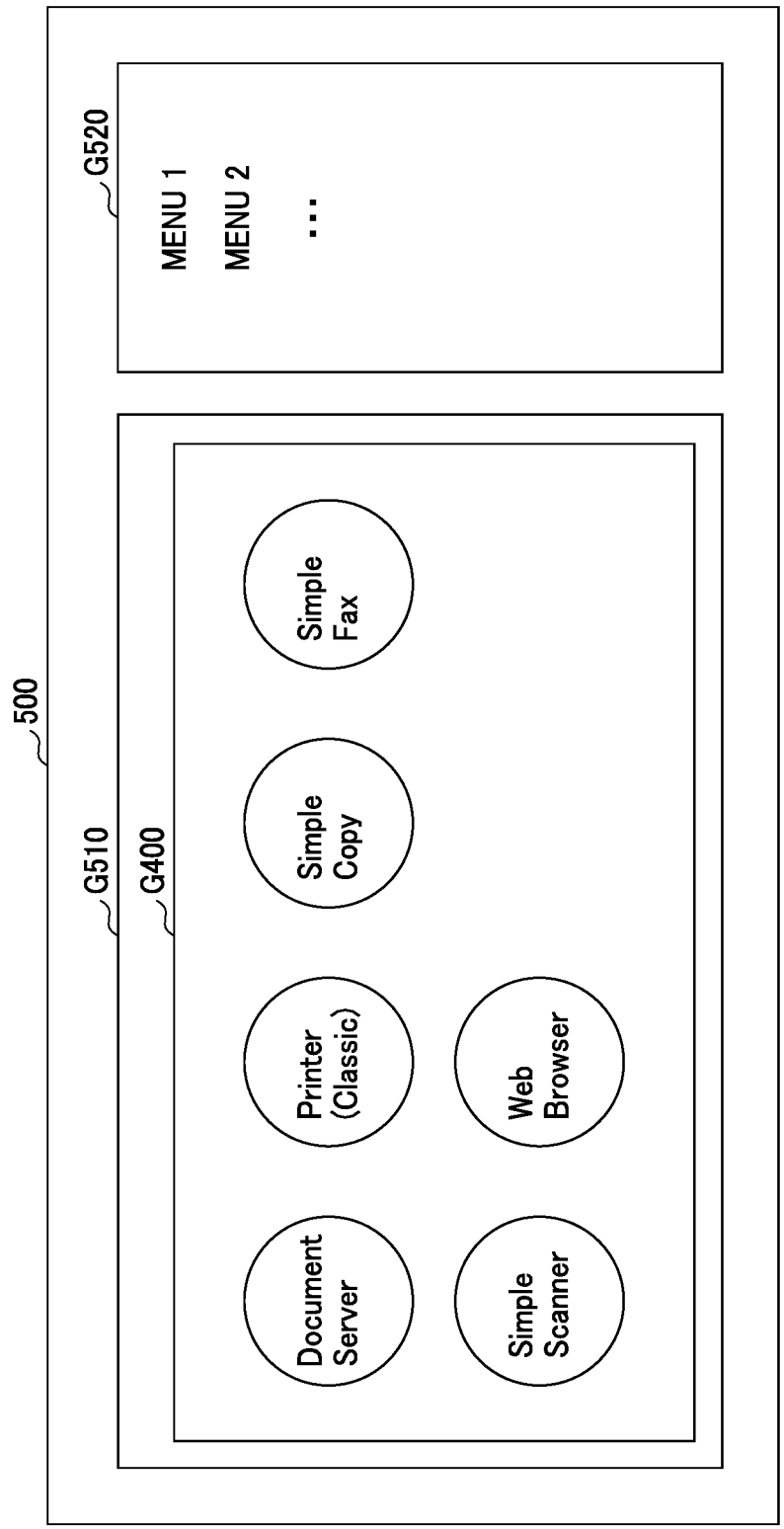

INFORMATION PROCESSING APPARATUS, INFORMATION PROCESSING SYSTEM, AND METHOD OF PROCESSING INFORMATION

CROSS-REFERENCE TO RELATED APPLICATION

This application claims priority pursuant to 35 U.S.C. § 119(a) to Japanese Patent Application No. 2017-211044, filed on Oct. 31, 2017 in the Japan Patent Office, the disclosure of which is incorporated by reference herein in its entirety.

BACKGROUND

Technical Field

This disclosure relates to an information processing apparatus, an information processing system, and a method of processing information.

Background Art

Apparatuses such as image forming apparatuses can provide a wide variety of functions. However, most of users rarely use all of functions, and many users feel annoying to see a wide variety of screen contents displayed on an operation panel of the apparatus because screen contents are too complicated.

A technique that can change the configuration of screen contents displayed on apparatuses is known. The configuration change of the screen contents displayed on the apparatuses includes, for example, changing a display state or status of one or more icons set for utilizing applications installed on the apparatuses between the "display" of icon and the "non-display" of icon. Therefore, for example, by applying given information (e.g., template information) defining the "display" status and the "non-display" status for each one of a plurality of icons, the "display" and "non-display" of the plurality of icons can be changed collectively, and the configuration of the screen contents can be changed easily.

When the template information is applied, the configuration of screen contents can be easily changed, but the configuration of screen contents may not be changed flexibly. For example, if one template information defining the "non-display" status of one icon is applied, and a user wants to change the "non-display" status of one icon to the "display" status of one icon while maintaining the "non-display" status of another icon, such selective change of the "non-display" status of one icon to the "display" of one icon cannot be performed because the "non-display" status of another icon also changes to the "display" status of another icon.

SUMMARY

In one aspect of the present invention, an information processing apparatus is devised. The information processing apparatus includes circuitry configured to acquire configuration information of a screen displayable on a partner apparatus connectable with the information processing apparatus via a network, acquire layout information indicating a layout state of one or more display elements arrangeable on the screen from the acquired configuration information, acquire layout template information defining the layout state of one or more display elements, edit the layout state of at least a part of the one or more display elements defined in the acquired layout template information to generate edited layout template information, and change the acquired layout information based on the edited layout template information.

In another aspect of the present invention, an information processing system including a partner apparatus and an information processing apparatus connectable to the partner apparatus via a network is devised. The information processing system includes circuitry configured to acquire configuration information of a screen displayable on the partner apparatus connected via the network, acquire layout information indicating a layout state of one or more display elements arrangeable on the screen from the acquired configuration information, acquire layout template information defining the layout state of one or more display elements, edit the layout state of at least a part of the one or more display elements defined in the acquired layout template information to generate edited layout template information, and change the acquired layout information based on the edited layout template information.

In another aspect of the present invention, a method of processing information displayable on a screen on an apparatus connectable via a network is devised. The method includes acquiring configuration information of the screen from the apparatus connected via the network, acquiring layout information indicating a layout state of each of one or more display elements arrangeable on the screen of the apparatus from the acquired configuration info, ration, acquiring layout template information defining the layout state of each of the one or more display elements, editing the layout state of at least a part of the one or more display elements defined in the acquired layout template information to generate edited layout template information, and changing the acquired layout information based on the edited layout template information.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 11 illustrates an example of icon layout template information;

FIG. 12 illustrates an example of icon layout information included in screen configuration information;

FIG. 13 illustrates an example of an icon layout comparison screen;

FIG. 15 illustrates an example of icon layout information after changing display status;

FIG. 18 is an example of an edit screen of an icon layout.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an embodiment of the present invention with reference to the drawings.

Figure 1:
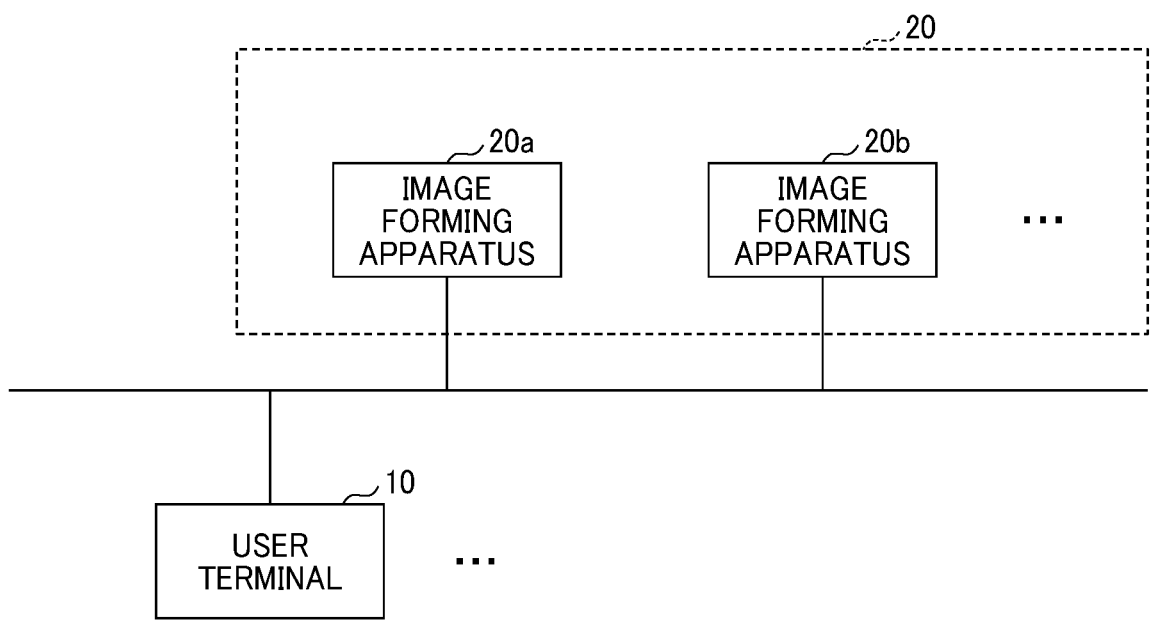
FIG. 1 illustrates an example of a schematic configuration of a system according to an embodiment.

System Configuration:

At first, a description is given of a schematic configuration of a system according to the embodiment with reference to FIG. 1. FIG. 1 illustrates an example of a schematic configuration of the system according to the embodiment.

As illustrated in FIG. 1, the system includes, for example, a user terminal 10, and one or more image forming apparatuses 20, such as an image forming apparatus 20a and an image forming apparatus 20b. The user terminal 10 and the image forming apparatus 20 can be connected with each other, for example, via a network such as local area network (LAN) and/or the Internet wirelessly or by wire. In this description, the user terminal 10 is used as an information processing apparatus.

The image forming apparatus 20 is an image processing apparatus, such as a multifunctional peripheral (MFP) having various image processing functions, such as a printing function, a scanning function, a copying machine function, a facsimile transmission function, and the like. Further, an apparatus having one of these various image processing functions can be also used as the image forming apparatus 20. In this description, the image forming apparatus 20 can be used as a partner apparatus to perform one or more functions, such as printing, scanning, or the like in conjunction with the user terminal 10.

For example, various apparatuses, such as a projector, a teleconference terminal, an electronic whiteboard, a digital camera, and the like can be used as the image forming apparatus 20.

The user terminal 10 is a computer that can be used by a user to change a configuration of a screen information (hereinafter, screen configuration information) displayed on an operation panel of the image forming apparatus 20. For example, a personal computer (PC), a mobile phone, a smartphone, a tablet terminal, a personal digital assistance (PDA), or the like can be used as the user terminal 10.

The configuration of the system illustrated in FIG. 1 is just one example, and other configurations can be used. For example, the system can include a plurality of user terminals 10.

Figure 2:
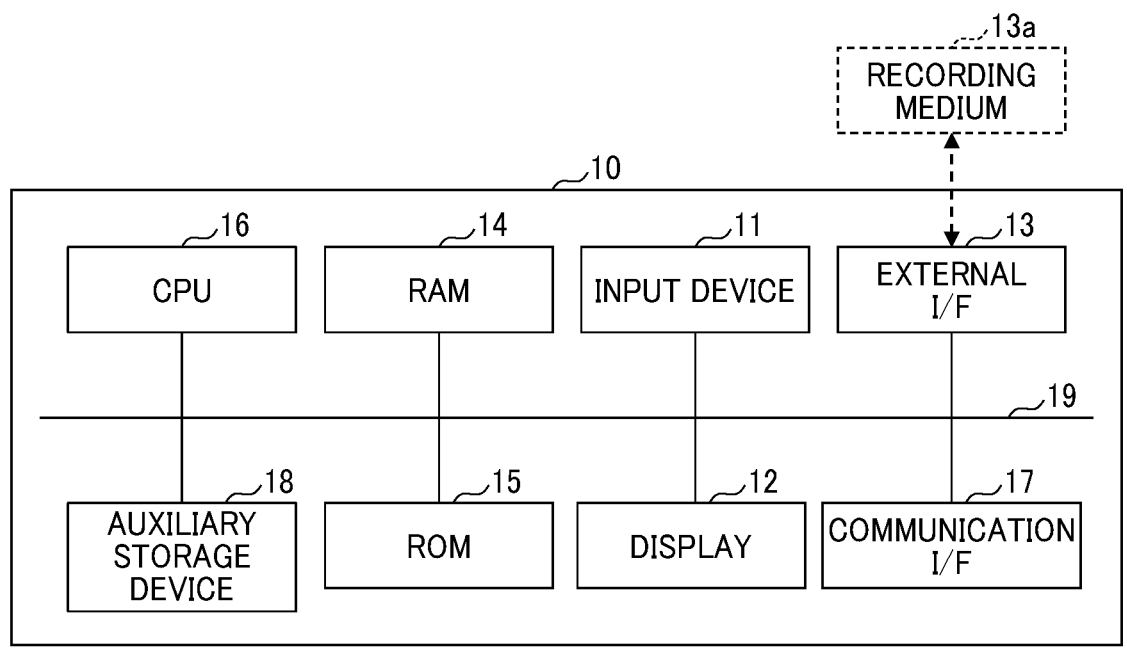
FIG. 2 illustrates an example of a hardware block diagram of a user terminal according to the embodiment.

Hardware Configuration:

Hereinafter, a description is given of a hardware configuration of the user terminal 10 according to the embodiment with reference to FIG. 2. FIG. 2 illustrates an example of a hardware block diagram of the user terminal 10.

As illustrated in FIG. 2, the user terminal 10 includes, for example, an input device 11, a display 12, an external interface (I/F) 13, and a random access memory (RAM) 14. The user terminal 10 further includes, for example, a read only memory (ROM) 15, a central processing unit (CPU) 16, a communication interface (I/F) 17, and an auxiliary storage device 18. These hardware components or resources are connected with each other via a bus 19.

The input device 11 includes, for example, a keyboard, a mouse, a touch panel, and the like, and is used by a user to input various operations and information. The display 12 is a display device that displays processing results of the user terminal 10 and information.

The external I/F 13 is an interface for communicating with an external device. The external device includes, for example, a recording medium 13a. The user terminal 10 can read data from the recording medium 13a and write data to the recording medium 13a via the external I/F 13. The recording medium 13a includes, for example, a flexible disk, a compact disc (CD), a digital versatile disc (DVD), a secure digital (SD) memory card, a universal serial bus (USB) memory, and the like.

The RAM 14 is a volatile semiconductor memory that temporarily stores programs and data. The ROM 15 is a nonvolatile semiconductor memory capable of storing programs and data even when a power supply is turned off. The ROM 15 stores programs and data, such as basic input/output system (BIOS), operating system (OS) settings, and network settings to be executed when the user terminal 10 is activated.

The CPU 16 is a computing device that controls the user terminal 10 entirely, such as functions of the user terminal 10 by loading the program and data from the ROM 15 and/or the auxiliary storage device 18 on the RAM 14, and executing the program.

The communication IX 17 is an interface for connecting the user terminal 10 to the network. The user terminal 10 can perform data communication via the communication I/F 17.

The auxiliary storage device 18 includes, for example, a hard disk drive (HDD), a solid state drive (SSD), or the like, and is a nonvolatile storage device that stores programs and data. The programs and data stored in the auxiliary storage device 18 include OS, which is basic software for controlling the user terminal 10 entirely, application software that provides various functions on the OS, and programs that implement the embodiment.

The user terminal 10 is configured using a hardware configuration illustrated in FIG. 2 to implement various processing to be described later.

Figure 3:
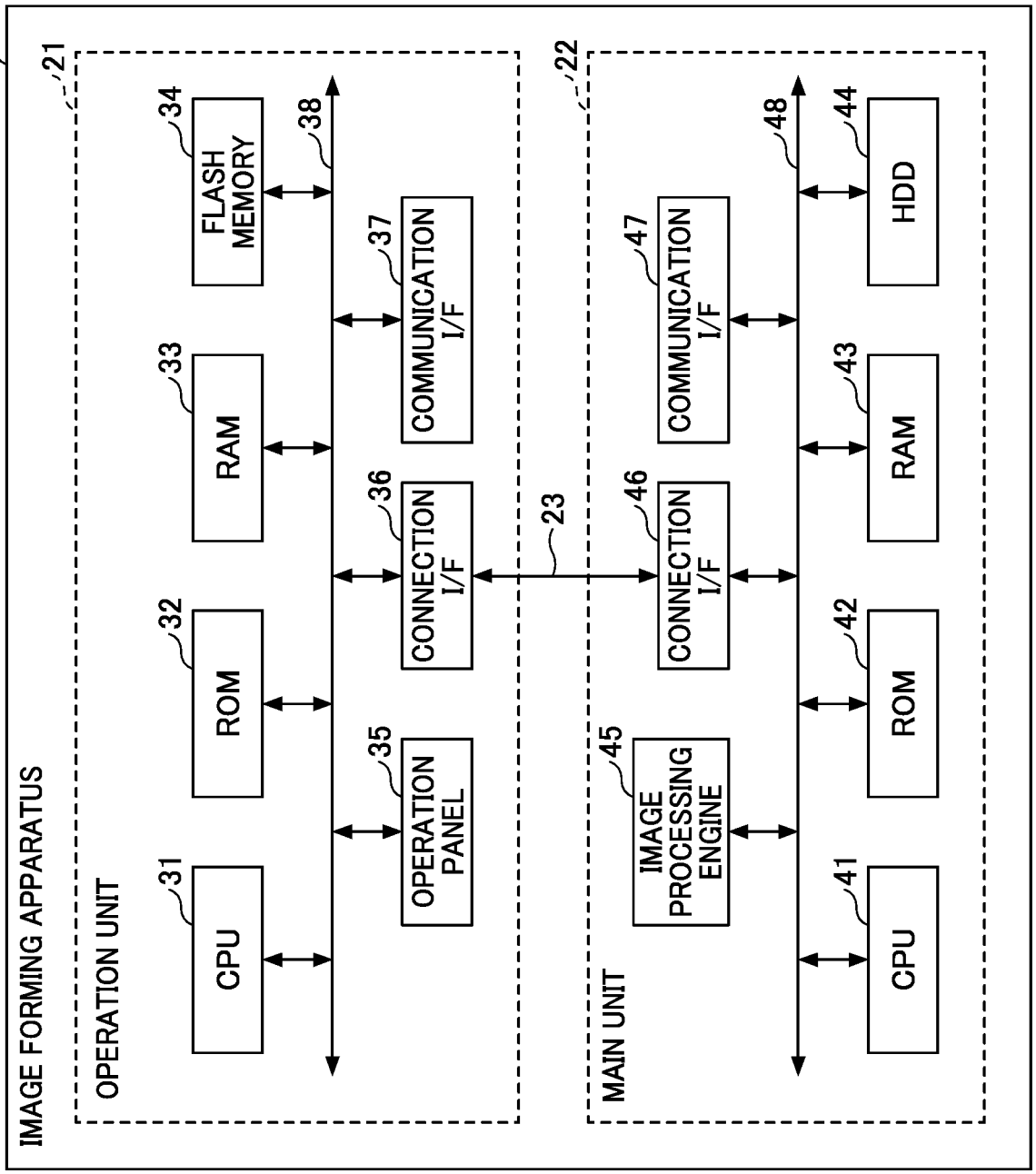
FIG. 3 illustrates an example of a hardware block diagram of an image for ring apparatus according to the embodiment.

Hereinafter, a description is given of a hardware configuration of the image forming apparatus 20 with reference to FIG. 3. FIG. 3 illustrates an example of the hardware block diagram of the image forming apparatus 20 according to the embodiment.

As illustrated in FIG. 3, the image forming apparatus 20 includes, for example, an operation unit 21, and a main unit 22. The operation unit 21 may be also referred to as the operation device, and the main unit 22 may be also referred to as the main device in this description.

The operation unit 21 is used when a user performs various operations, such as selecting an image processing function to be performed by the main unit 22, inputting various settings for causing the main unit 22 to perform an image processing function, inputting an instruction for starting an image processing function, and switching a display screen.

The main unit 22 performs various processing, such as performing an image processing function, in accordance with various operations of the user on the operation unit 21.

As illustrated in FIG. 3, the operation unit 21 of the image forming apparatus 20 includes, for example, a CPU 31, a ROM 32, a RAM 33, a flash memory 34, an operation panel 35, a connection I/F 36, and a communication I/F 37. These hardware components are connected with each other via a bus 38.

The CPU 31 is a computing device that controls the operation unit 21 entirely, such as functions of the operation unit 21 by loading the program and data from the ROM 32 and/or the flash memory 34 on the RAM 33 and executing the program.

The ROM 32 is a nonvolatile semiconductor memory capable of retaining programs and data even when a power supply is turned off. The RAM 33 is a volatile semiconductor memory that temporarily stores programs or data.

The flash memory 34 is a nonvolatile storage device that stores programs and data. The operation panel 35 is used when a user performs various operations. The operation panel 35 displays various screens or the like for the user.

The connection I/F 36 is an interface for communicating with the main unit 22 via the communication channel 23. The connection I/F 36 is, for example, a USB standard interface.

The communication I/F 37 is an interface for communicating with other devices or the like. For example, wireless local area network (LAN) using Wi-Fi (registered trademark) standard can be used for the communication I/F 37.

Similarly, the main unit 22 of the image forming apparatus 20 includes, for example, a CPU 41, a ROM 42, a RAM 43, an HDD 44, an image processing engine 45, a connection I/F 46, and a communication I/F 47. These hardware components are connected with each other via a bus 48.

The CPU 41 is a computing device that controls the main unit 22 entirely, such as functions of the main unit 22 by loading the program and data from the ROM 42 and/or the HDD 44 on the RAM 43, and executing the program.

The ROM 42 is a nonvolatile semiconductor memory capable of retaining programs and data even when a power supply is turned off. The RAM 43 is a volatile semiconductor memory that temporarily stores programs and data.

The HDD 44 is a non-volatile storage device that stores programs and data. The image processing engine 45 is a hardware component for performing one or more image processing for implementing various image processing functions, such as a printing function, a scanning function, a copying function, and a facsimile communication function.

The image processing engine 45 includes, for example, a plotter for printing an image on a sheet such as paper, a scanner for optically scanning document, and a facsimile communication device for performing facsimile communication. The image processing engine 45 further includes, for example, a finisher for sorting printed sheets, an automatic document feeder (ADF) for automatically feeding documents, and the like.

The connection I/F 46 is an interface for communicating with the operation unit 21 via the communication channel 23. The connection I/F 46 is, for example, a USB standard interface.

The communication I/F 47 is an interface for communicating with other devices or the like. For example, the communication I/F 47 can use the wireless local area network (LAN) using Wi-Fi (registered trademark) standard.

By employing the hardware configuration illustrated in FIG. 3, the image forming apparatus 20 can implement various processes to be described later.

Although FIG. 3 illustrates one configuration that the image forming apparatus 20 including the operation unit 21, but not limited thereto. For example, an information processing terminal such as a tablet terminal, a smartphone, a cellular phone, a personal digital assistant (PDA) or the like can perform the function of the operation unit 21 of the image forming apparatus 20. That is, the information processing terminal can control the image forming apparatus 20 by communicating with the image forming apparatus 20 via the communication I/F 37 of the operation unit 21 or the communication I/F 47 of the main unit 22.

Figure 4:
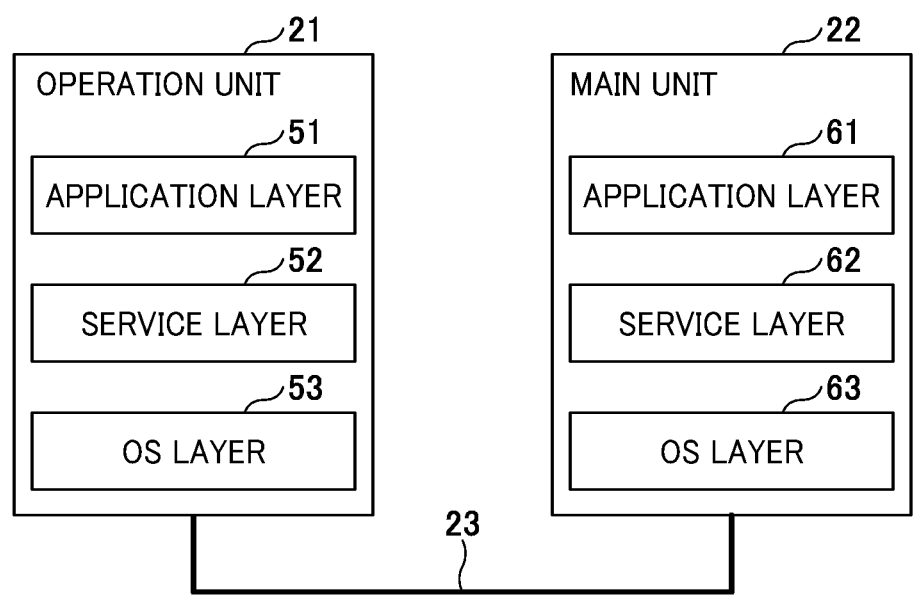
FIG. 4 illustrates an example of a hierarchical structure of a program group included in an operation unit and a main unit of an image forming apparatus according to the embodiment.

Hierarchy Structure of Program Group of Image Forming Apparatus:

Hereinafter, a description is given of a hierarchical structure of a program group included in the operation unit 21 and the main unit 22 of the image forming apparatus 20 with reference to FIG. 4. FIG. 4 illustrates an example of a hierarchical structure of a program group included in the operation unit 21 and the main unit 22 of the image forming apparatus 20 according to the embodiment.

FIG. 4 illustrates a hierarchical structure of the program group included in the operation unit 21, and a hierarchical structure of the program group included in the main unit 22.

Hereinafter, a description is given of the hierarchical structure of the program group (i e a program group stored in the ROM 42 and/or the HDD 44 of the main unit 22) included in the main unit 22. The program group included in the main unit 22 can be classified into an application layer 61, a service layer 62, and an OS layer 63.

One or more programs classified into the application layer 61 are programs used for operating hardware resources to implement one or more image processing functions. Specifically, the application layer 61 includes, for example, a print application, a scan application, a copy application, a facsimile application or the like.

One or more programs classified into the service layer 62 are programs that are interposed between the application layer 61 and the OS layer 63. The program of the service layer 62 serves as an interface for utilizing hardware resources disposed for the main unit 22 by the program of the application layer 61, and as an interface for notifying a status of hardware resources disposed for the main unit 22.

Specifically, a request for executing a hardware resource is received by the service layer 62, and a mediation of a received execution request is performed by the service layer 62. The execution request received by the service layer 62 includes, for example, a request to execute one or more image processing using the image processing engine 45, such as a request to execute scanning using a scanner, a request to execute printing using a plotter, or the like.

The role of the interface performed by the program classified into the service layer 62 is similar with respect to the application layer 51 of the operation unit 21. That is, the program classified into the application layer 51 of the operation unit 21 also accesses the service layer 62 to operate the hardware resources of the main unit 22 to implement one or more image processing functions.

One or more programs classified into the OS layer 63 are programs referred to as basic software such as operating system (OS), which provides a basic function to control the hardware resources disposed for the main unit 22. The program classified into OS layer 63 receives a request for executing the hardware resources from the program classified into the application layer 61 via the program classified into the service layer 62 to implement the processing corresponding to the execution request.

Hereinafter, a description is given of the hierarchical structure of the program group (i.e., program group stored in the ROM 32 and/or the flash memory 34 of the operation unit 21) included in the operation unit 21. Similar to the main unit 22, the program group included in the operation unit 21 can be classified into an application layer 51, a service layer 52, and an OS layer 53.

However, functions provided by the programs classified into the application layer 51 and types of the execution requests that the service layer 52 of the operation unit 21 can receive are different from the main unit 22. One or more programs classified into the application layer 51 of the operation unit 21 mainly provide a user interface function for performing various operations and various displaying.

In the embodiment, it is assumed that the operation unit 21 and the main unit 22 operate independently. Further, if the operation unit 21 and the main unit 22 can communicate with each other, it is not necessary for the operating system of the operation unit 21 and the operating system of the main unit 22 to be the same type. For example, the operation unit 21 can use one type, such as Android (registered trademark) as the OS while the main unit 22 can use another type, such as Linux (registered trademark) as the OS.

As to the image forming apparatus 20 according to the embodiment, the operation unit 21 is controlled by one operating system and the main unit 22 is controlled by another operating system, which may be different operating systems. Therefore, communication between the operation unit 21 and the main unit 22 is performed as communication between different information processing apparatuses, rather than an internal communication processing in a single apparatus.

However, the image forming apparatus 20 is not limited to a case where the operation unit 21 and the main unit 22 are operated using different types of operating systems. For example, the operation unit 21 and the main unit 22 can be operated using the same type of operating system. Further, the image forming apparatus 20 is not limited to a case where one operating system is operated at the operation unit 21 and another operating system is operated independently at the main unit 22. For example, the operation unit 21 and the main unit 22 can be operated using a single operating system.

Figure 5:
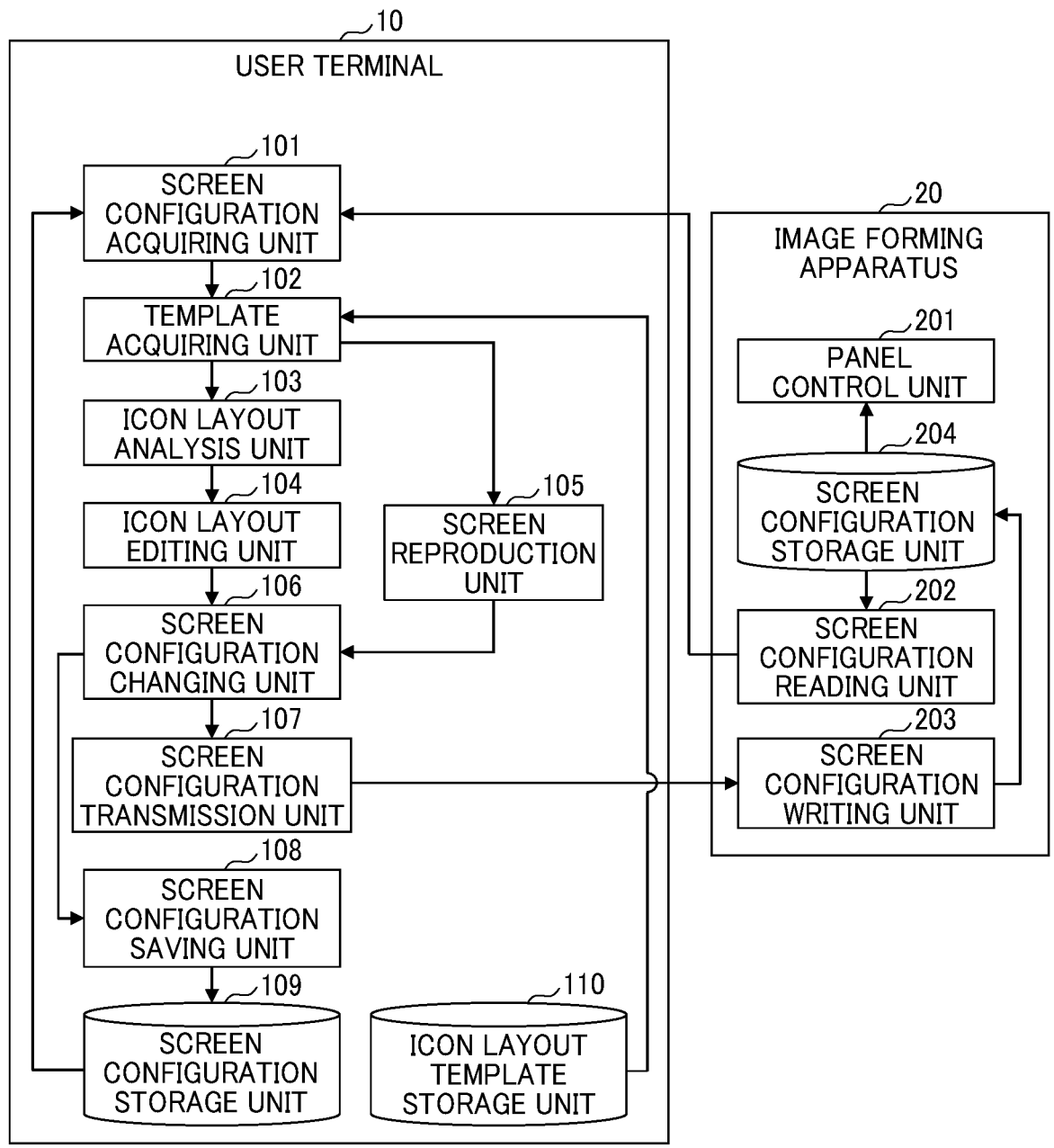
FIG. 5 illustrates an example of a functional block diagram of a user terminal and an image forming apparatus according to the embodiment.

Functional Configuration:

Hereinafter, a description is given of a functional configuration of the user terminal 10 and the image forming apparatus 20 according to the embodiment with reference to FIG. 5. FIG. 5 illustrates an example of a functional block diagram of the user terminal 10 and the image forming apparatus 20 according to the embodiment.

As illustrated in FIG. 5, the image forming apparatus 20 includes, for example, a panel control unit 201, a screen configuration reading unit 202, and a screen configuration writing unit 203. These functional units are implemented by executing one or more programs installed on the operation unit 21 of the image forming apparatus 20 using the CPU 31.

The image forming apparatus 20 further includes, for example, a screen configuration storage unit 204. The screen configuration storage unit 204 can be implemented, for example, by using the flash memory 34. Further, the screen configuration storage unit 204 can be implemented by using a storage device connected to the image forming apparatus 20 via a network.

The panel control unit 201 controls the displaying status or state of information displayed on the operation panel 35 used as a display screen. The operation panel 35 displays various screens including an initial screen or home screen (hereinafter, "initial screen"). The initial screen is displayed based on screen configuration information stored in the screen configuration storage unit 204. The screen configuration information (first layout information) includes, for example, information indicating a configuration of one or more display elements (e.g., icons) displayable or arrangeable on the screen, such as the initial screen. The initial screen is, for example, a screen that serves as a screen for starting an operation of the image forming apparatus 20. The initial screen is, for example, a screen to be displayed for the first time when the image forming apparatus 20 becomes ready for operation, or a screen arranging one or more icons, respectively indicating one or more applications installed on the image forming apparatus 20, with a style that a user can select the one or more icons. The image forming apparatus 20 becomes ready for operation, for example, when the activation of the image forming apparatus 20 is completed or when an authentication is successful if the authentication is required.

In response to a request from the user terminal 10, the screen configuration reading unit 202 reads out the screen configuration information stored in the screen configuration storage unit 204, and then transmits the screen configuration information to the user terminal 10.

The screen configuration writing unit 203 writes the screen configuration information, transmitted from the user terminal 10, to the screen configuration storage unit 204.

As illustrated in FIG. 5, the user terminal 10 includes, for example, a screen configuration acquiring unit 101, a template acquiring unit 102, an icon layout analysis unit 103, an icon layout editing unit 104, a screen reproduction unit 105, a screen configuration changing unit 106, a screen configuration transmission unit 107, and a screen configuration saving unit 108. These functional units are implemented by executing one or more programs installed on the user terminal 10 using the CPU 16.

The user terminal 10 further includes, for example, a screen configuration storage unit 109, and an icon layout template storage unit 110. The screen configuration storage unit 109 and the icon layout template storage unit 110 can be implemented by using, for example, the auxiliary storage device 18. Further, at least any one of the screen configuration storage unit 109 and the icon layout template storage unit 110 can be implemented using a storage device or the like connected to the user terminal 10 via a network.

The screen configuration acquiring unit 101 acquires the screen configuration information to be changed (i.e., change target) from any image forming apparatus 20 among one or more image forming apparatuses 20 or from the screen configuration storage unit 109.

When to use icon layout template information (second layout information), the template acquiring unit 102 acquires the icon layout template information stored in the icon layout template storage unit 110. The icon layout template information is information defining a template (i.e., icon layout definition information), in which one or more icons to be arranged on the initial screen are defined in advance. The icon layout template information includes, for example, identification information identifying the icon layout template (e.g., template name), and a display status indicating whether each icon is displayed (arranged) or not on the initial screen.

By selecting an icon arranged on the initial screen, a user can start to use an application corresponding to the selected icon among the applications installed on the operation unit 21 of the image forming apparatus 20. The icon is an example of a display element or part arranged on the initial screen. In addition to the icon corresponding to the application, the display element includes, for example, an icon corresponding to a widget, and an icon corresponding to a shortcut to a web page.

The icon layout analysis unit 103 analyzes the screen configuration information acquired by the screen configuration acquiring unit 101 to acquire the icon layout information from the screen configuration information. The icon layout information is information defining a layout state or status of one or more icons arranged on the initial screen. The icon layout information may be also referred to as icon display information.

The icon layout editing unit 104 displays a comparison screen (i.e., icon layout comparison screen) comparing an icon layout specified by the icon layout information acquired by the icon layout analysis unit 103, and an icon layout defined by the icon layout template information. Further, the icon layout editing unit 104 edits the icon layout template information acquired by the template acquiring unit 102 in response to a change instruction performed by a user on the icon layout comparison screen, to be described later.

When the icon layout template information is not to be used, the screen reproduction unit 105 emulates the display processing of the initial screen by the panel control unit 201 based on the screen configuration information. That is, the screen reproduction unit 105 displays the initial screen based on the screen configuration information acquired by the screen configuration acquiring unit 101 using the same display status applied to the image forming apparatus 20.

The screen configuration changing unit 106 changes the screen configuration information. That is, when the icon layout template information is used, the screen configuration changing unit 106 changes the icon layout information included in the screen configuration information acquired by the screen configuration acquiring unit 101 based on the icon layout template information edited by the icon layout editing unit 104. On the other hand, when the icon layout template information is not to be used, the screen configuration changing unit 106 changes the screen configuration information acquired by the screen configuration acquiring unit 101 in accordance with a change instruction performed by a user on the initial screen reproduced by the screen reproduction unit 105.

The screen configuration transmission unit 107 transmits the screen configuration information changed by the screen configuration changing unit 106 to the designated image forming apparatus 20.

The screen configuration saving unit 108 stores the screen configuration information changed by the screen configuration changing unit 106 in the screen configuration storage unit 109.

Figure 6:
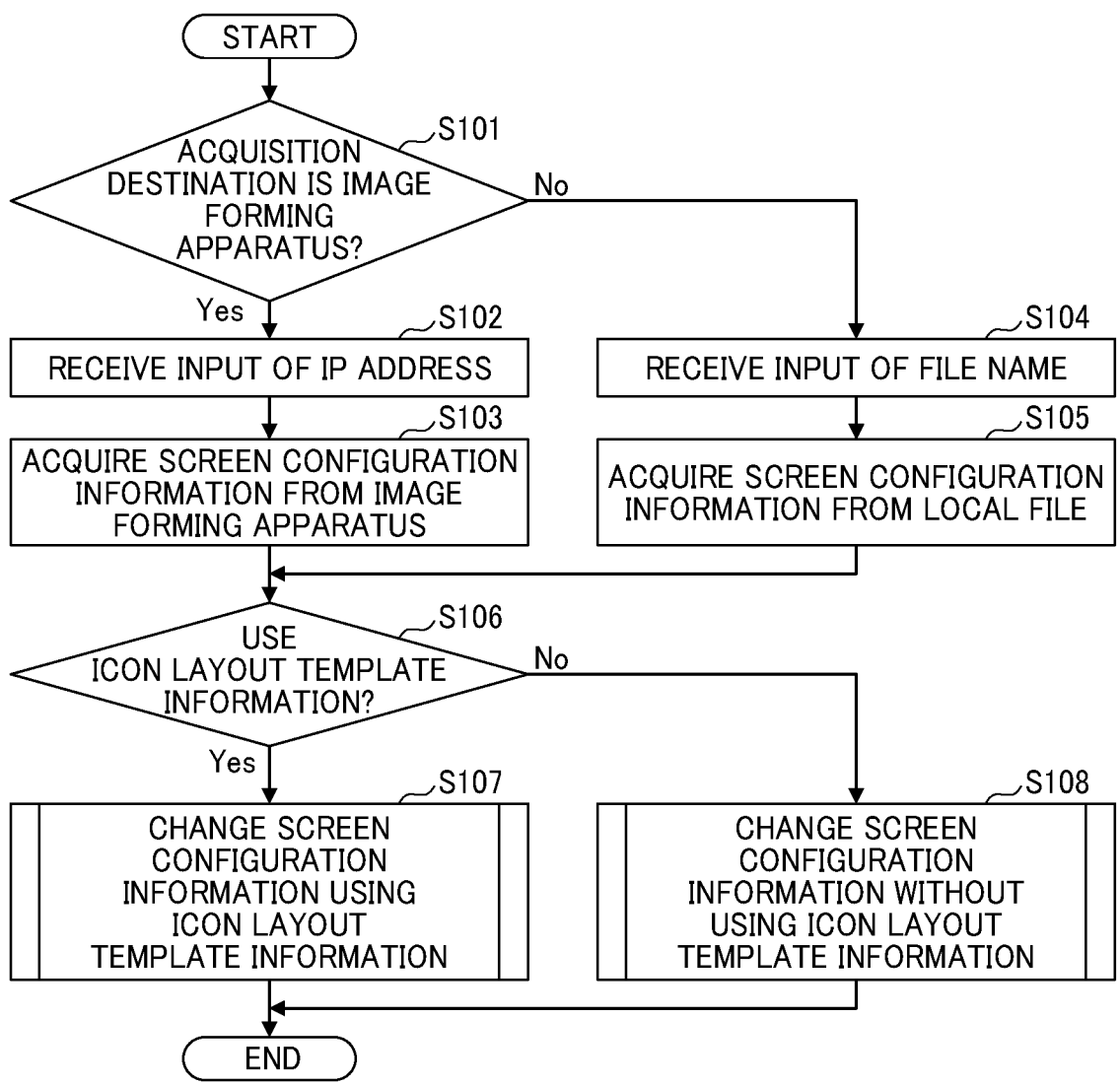
FIG. 6 is an example of a flow chart illustrating the steps of processing performed by a user terminal.

Processing of User Terminal:

Hereinafter, a description is given of processing performed by the user terminal 10 with reference to FIG. 6. FIG. 6 is an example of a flow chart illustrating the steps of processing performed by the user terminal 10. In the sequence of FIG. 6, a user operates the user terminal 10.

When an acquisition instruction of the screen configuration information is input by the user, the screen configuration acquiring unit 101 determines whether an acquisition destination of the screen configuration information designated by the acquisition instruction is the image forming apparatus 20 or a local file of the user terminal 10 (step S101). The local file is, for example, a file stored in the screen configuration storage unit 109 of the user terminal 10 operated by the user. However, the screen configuration information can be stored in the screen configuration storage unit 109 using a data format other than the file.

If the acquisition destination of the screen configuration information is the image forming apparatus 20 (step S101: YES), the screen configuration acquiring unit 101 receives an input of an internet protocol (IP) address of the image forming apparatus 20 by the user, in which the screen configuration information is to be acquired from the image forming apparatus 20 (step S102). For example, the screen configuration acquiring unit 101 can display a screen for inputting the IP address, and receive the input IP address designated by the user on the screen. The IP address is just one example indicating the acquisition destination. For example, the screen configuration acquiring unit 101 can receive an input of various identification information that can identify the image forming apparatus 20, such as uniform resource locator (URL), media access control (MAC) address, and/or manufacturing lot number.

Then, the screen configuration acquiring unit 101 acquires the screen configuration information, stored in the screen configuration storage unit 204 of the image forming apparatus 20, from the image forming apparatus 20 identified by the received 1P address (step S103). More specifically, the screen configuration acquiring unit 101 transmits a request for acquiring the screen configuration information to the image forming apparatus 20. In response to the acquisition request of the screen configuration information, the screen configuration reading unit 202 of the image forming apparatus 20 acquires or reads the screen configuration information stored in the screen configuration storage unit 204, and then returns the acquired or read screen configuration information to the screen configuration acquiring unit 101 of the user terminal 10. With this configuration, the screen configuration information is acquired by the screen configuration acquiring unit 101.

Figure 7:
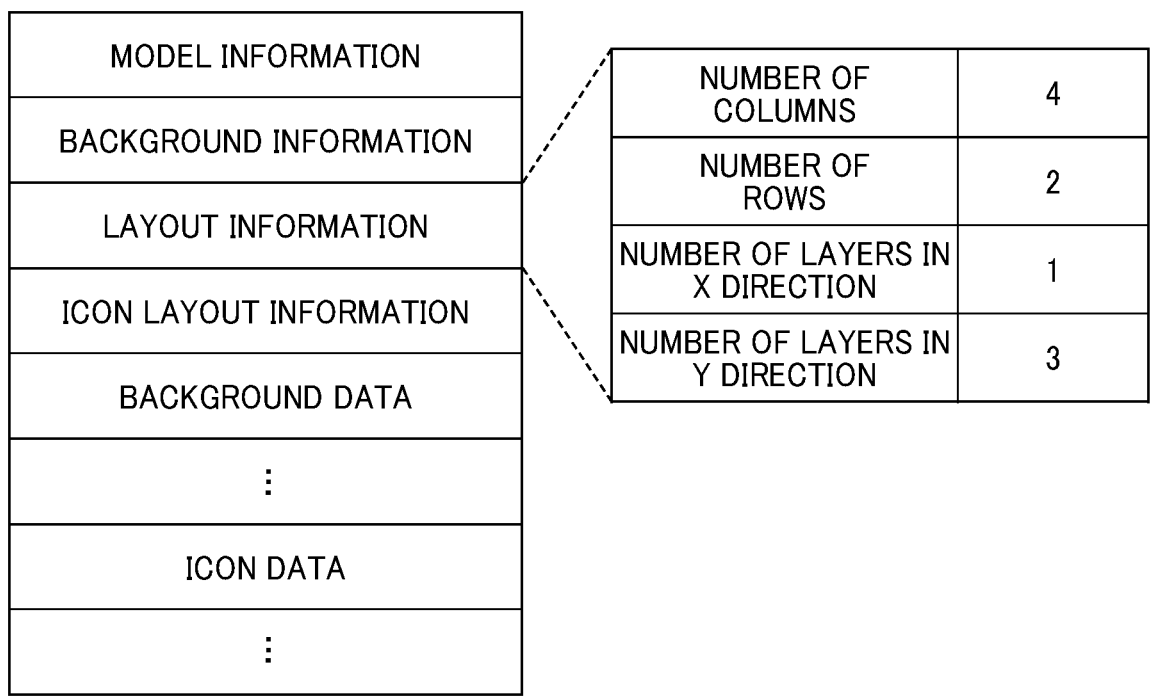
FIG. 7 illustrates an example of screen configuration information.

Hereinafter, a description is given of the screen configuration information acquired by the screen configuration acquiring unit 101 with reference to FIG. 7. FIG. 7 illustrates an example of the screen configuration information. In FIG. 7, the screen configuration information is expressed in a tabular or table form for convenience, but the screen configuration information can be expressed in any form using, for example, comma separated values (CSV) and extensible markup language (XML).

As illustrated in FIG. 7, the screen configuration information includes, for example, model information, background information, layout information, icon layout information, background data, and icon data. However, other information can be included in the screen configuration information.

The model information is information related to a model or type of the image forming apparatus 20 capable of applying the screen configuration information, which means the screen configuration information that is valid for the image forming apparatus 20. For example, the model information includes a model name, a model number, and the like.

The background information is data used as a background (e.g., wallpaper) of the initial screen (hereinafter referred to as "wallpaper data"). For example, the background information includes identification information of wallpaper data (e.g., wallpaper ID) of any one of the wallpaper data among a plurality of the wallpaper data.

The layout information is information related to a layout state or status of the initial screen arranging one or more display elements or parts (hereinafter, the display element is assumed to be the icon).

The icon layout information is information defining whether displaying or not displaying one or more icons on the initial screen for each identification information (e.g., icon name) identifying each icon set for utilizing each application installed on the operation unit 21 of the image forming apparatus 20. The identification information for identifying the icon can employ icon identification (ID) or the like.

The background data is one or more image data available for the background (e.g., wallpaper) of the initial screen. The icon data is image data of icons (hereinafter, "icon data") set for utilizing applications installed on the operation unit 21 of the image forming apparatus 20. For example, the screen configuration information includes a list of the icon data, corresponding to the icons set for utilizing the applications installed on the operation unit 21 of the image forming apparatus 20, by encoding the icon data.

As illustrated in FIG. 7, the layout information, included in the screen configuration information, includes the number of columns, the number of rows, the number of layers in X direction, and the number of layers in Y direction. The number of columns is the number of icons that can be arranged in one layer in a horizontal direction. The number of rows is the number of icons that can be arranged in one layer in a vertical direction. The number of layers in X direction is the number of layers in the horizontal direction. The number of layers in Y direction is the number of layers in the vertical direction. In this description, the "layer" is a unit of a display range (display area) that can be switched, for example, by performing a swipe operation or a scroll operation on the operation panel 35. An example illustrated in FIG. 7 indicates that the number of columns=4, the number of rows=2, the number of layers in X direction=1, and the number of layers in Y direction=3. In this case, the initial screen employs a layout illustrated in FIG. 8.

Figure 8:
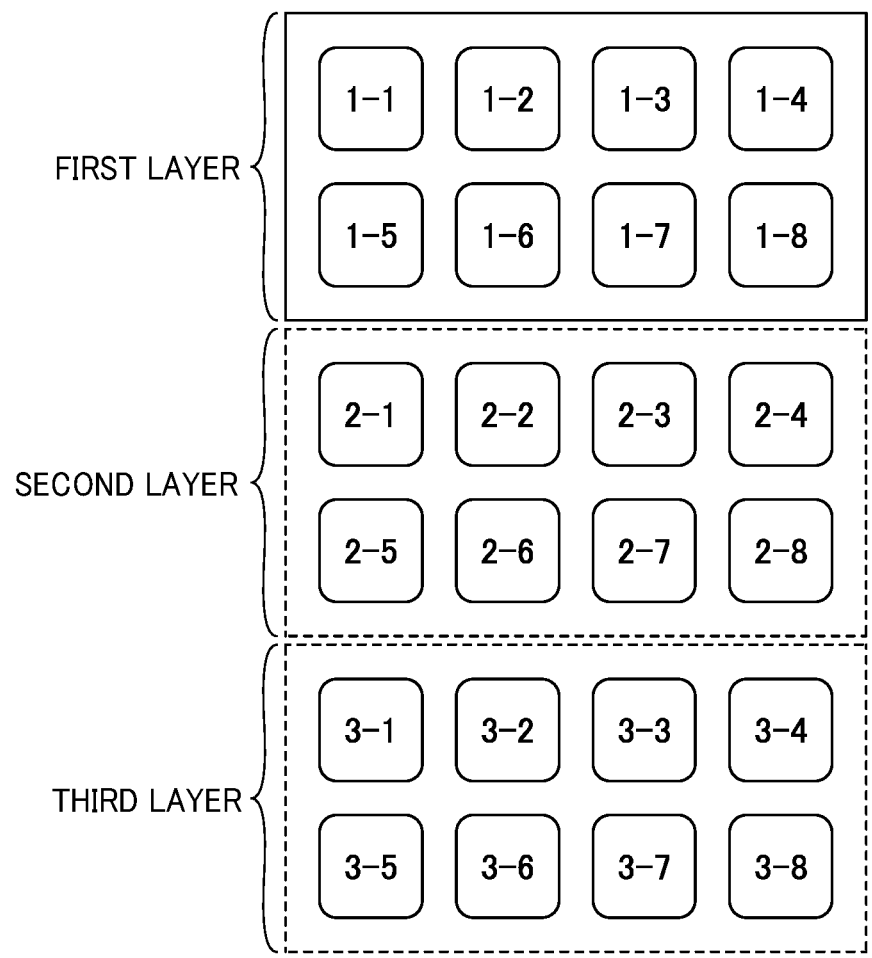
FIG. 8 illustrates an example of a layout state of an initial screen.

FIG. 8 illustrates an example of a layout state or status of the initial screen. In FIG. 8, three layers such as a first layer, a second layer, and a third layer are set in the vertical direction. The range that can be displayed at the same time is one layer. Each layer includes layout positions of icons having two (2) rows and four (4) columns (eight pieces of icons in a matrix). Each layout position has a coordinate value expressed, for example, in a form of combing a layer number and a position number ("<layer number>-<position number>."), such as "1-1, 1-2, 1-3, . . . and 3-8." The layer number is an identification number of each layer. The position number is a serial number in each layer unit. That is, in FIG. 8, the position number takes values of 1 to 8 because the layout position includes eight layout positions for each layer unit.

The description is returned to FIG. 6. If the acquisition destination of the screen configuration information is the local file of the user terminal 10 (step S101: NO), the screen configuration acquiring unit 101 receives an input of a file name of the local file from the user (step S104). For example, the screen configuration acquiring unit 101 displays a screen for inputting the file name of the local file, and to receive an input of the file name of the local file designated by the user on the screen.

Then, the screen configuration acquiring unit 101 acquires the screen configuration information from the local file of the user terminal 10 having the file name received in step S104 among the files stored in the screen configuration storage unit 109 (step S105). The screen configuration information acquired in step S105 also uses the configuration described in FIG. 7.

Further, instead of the file name, the model or type name of the image forming apparatus 20 can be input by the user. In this case, the screen configuration acquiring unit 101 can acquire the screen configuration information including the input model name from the screen configuration information stored in the screen configuration storage unit 109.

Further, steps S104 and S105 are useful when, for example, a vendor of the image forming apparatus 20 wants to customize the screen configuration information for the image forming apparatus 20 in advance before delivering the image forming apparatus 20 to the customer. Further, steps S104 and S105 are also useful when the screen configuration information already customized for one image forming apparatus 20 is to be used for generating the screen configuration information for another image forming apparatus 20.

After steps S103 or S105, the template acquiring unit 102 determines whether to use the icon layout template information (step S106).

Figure 9:
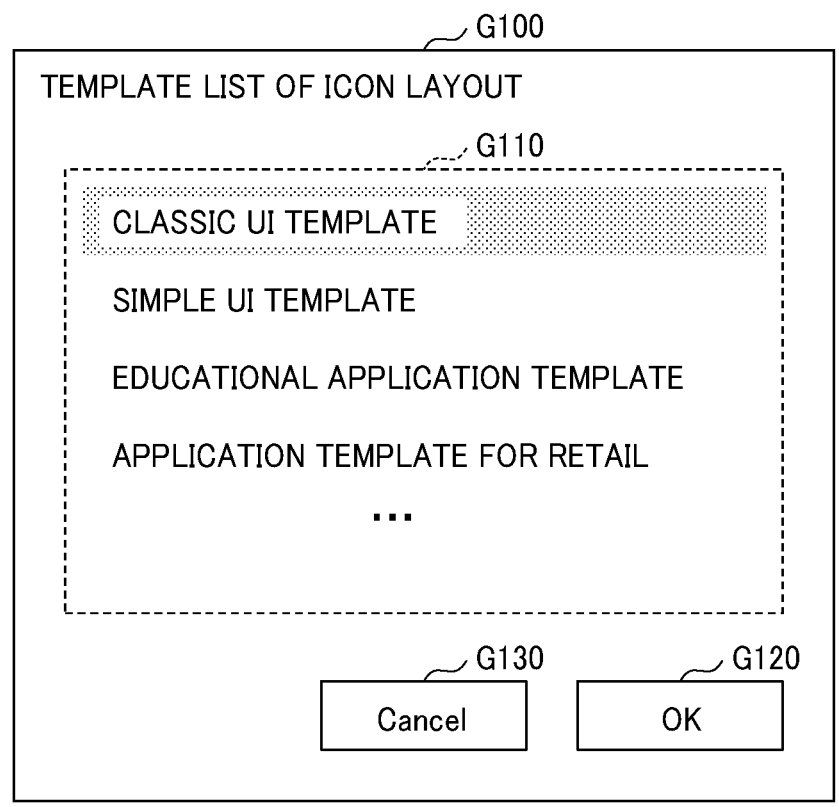
FIG. 9 illustrates an example of a template selection screen.

For example, the template acquiring unit 102 displays a template selection screen G100 illustrated in FIG. 9. When a template is selected from a template list G110 on the template selection screen G100, and the user presses an OK button G120, the template acquiring unit 102 determines that the icon layout template information is to be used. For example, the template list G110 displays a list of selectable identification information (e.g., template name) identifying each icon layout template information stored in the icon layout template storage unit 110. In an example case of FIG. 9, the template list G110 displays a list of selectable template names of "Classic UI Template," "Simple UI Template," "Educational Application Template," and "Application Template for Retail."

On the other hand, for example, if a cancel button G130 on the template selection screen G100 is pressed by the user, the template acquiring unit 102 determines that the icon layout template is not to be used. Further, if the template selection screen G100 illustrated in FIG. 9 is not displayed (e.g., when the user does not perform an operation for displaying the template selection screen G100 illustrated in FIG. 9), the template acquiring unit 102 determines that the icon layout template is not to be used.

If the icon layout template information is to be used (step S106: YES), the user terminal 10 changes the screen configuration information using or applying the icon layout template information (step S107). On the other hand, if the icon layout template information is not to be used (step S106: NO), the user terminal 10 changes the screen configuration information without using the icon layout template information (step S108).

Figure 10:
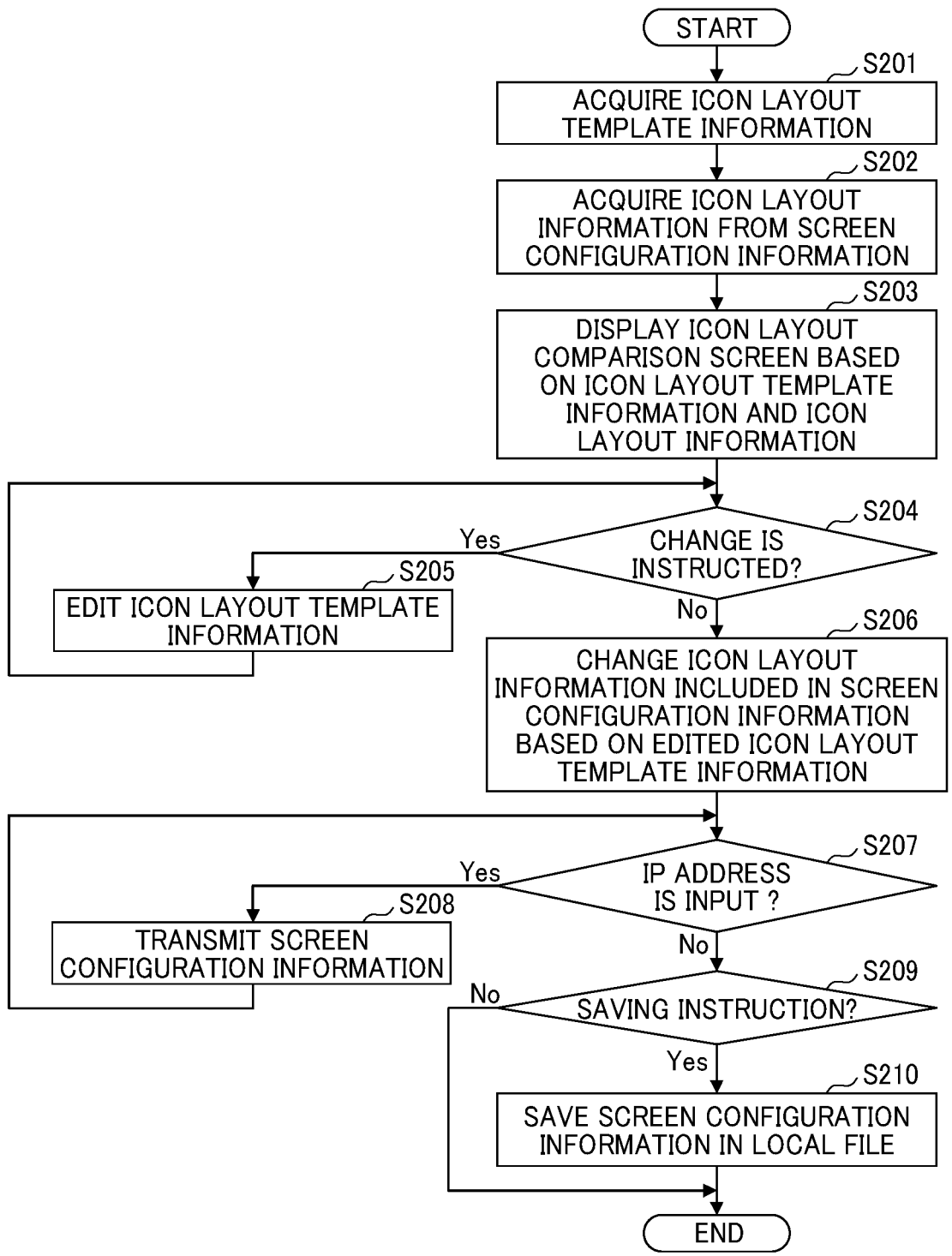
FIG. 10 is an example of a flow chart illustrating the steps of processing when screen configuration information is to be changed using icon layout template information.

Hereinafter, a description is given of the processing in step S107 (process of changing the screen configuration information using the icon layout template information) with reference to FIG. 10. FIG. 10 is an example of a flow chart illustrating the steps of processing when the screen configuration information is to be changed using the icon layout template information.

At first, the template acquiring unit 102 acquires the icon layout template information corresponding to a template name selected from the template list G110 of the template selection screen G100 (FIG. 9) from the icon layout template storage unit 110 (step S201). For example, based on the model information included in the screen configuration information, the template acquiring unit 102 can acquire the icon layout template information corresponding to the model information.

Hereinafter, a description is given of an example of the icon layout template information stored in the icon layout template storage unit 110 with reference to FIG. 11. FIG. 11 illustrates an example of the icon layout template information.

As illustrated in FIG. 11, the icon layout template information includes, for example, a template name that identifies each icon layout template. Further, as illustrated in FIG. 11, the icon layout template information includes, for example, a display status indicating whether to display (arrange) or not to display (not to arrange) each icon on the initial screen for each icon name of each icon set for utilizing each application installed on the operation unit 21 of the image forming apparatus 20.

For example, the icon layout template includes a template name of "Classic UI Template" as illustrated in FIG. 11. In this description, "UI" indicates a user interface.

Further, in an example case of FIG. 11, the icon layout template information includes a display status of "non-display" for an icon name of "Address Management." This indicates that when the icon layout template (FIG. 11) is applied, the icon corresponding to the icon name of "Address Management" is not displayed (not arranged) on the initial screen.

On the other hand, for example, the icon layout template information includes an icon name of "Copier (Classic)" set with a display status of "display" as illustrated in FIG. 11. This indicates that when the icon layout template (FIG. 11) is applied, the icon corresponding to the icon name of "Copier (Classic)" is displayed on the initial screen.

Similarly, as illustrated in FIG. 11, the icon layout template information includes, for example, an icon name of "Document Server" set with a display status of "display," an icon name of "Fax (Classic)" set with a display status of "display," and an icon name of "Printer (Classic) with a display status of "display." Similarly, as illustrated in FIG. 11, the icon layout template information includes, for example, an icon name of "Simple Copy" set with a display status of "non-display," an icon name of "Simple Fax" set with a display status of "non-display," and an icon name of "Simple Scanner" set with a display status of "non-display." Similarly, as illustrated in FIG. 11, the icon layout template information includes, for example, an icon name of "Scanner (Classic)" set with a display status of "display," and an icon name of "Web Browser" set with a display status of "non-display."

Further, the icon layout template information includes the display status for each icon name of each icon set for utilizing each application pre-installed on the operation unit 21 of the image forming apparatus 20 (i.e., application is installed before the factory shipment). However, for example, if a new application is installed on the operation unit 21 of the image forming apparatus 20 by a sales vendor or a customer of the image forming apparatus 20 after the factory shipment, an icon set for utilizing the new application can be added to the icon layout template information. Similarly, if a specific application of the operation unit 21 of the image forming apparatus 20 is deleted by the sales vendor or customer of the image forming apparatus 20 after the factory shipment, the display status of the icon set for utilizing the specific application can be deleted from the icon layout template information.

Further, in FIG. 11, the icon layout template information includes the display status indicating whether the icon corresponding to the icon name is displayed (arranged) or not on the initial screen for each icon name (i.e., an example of identifying information identifying the icon), but not limited thereto. For example, the icon layout template information can include a coordinate value where the icon corresponding to the icon name is arranged for each icon (i.e., coordinate value of each icon arranged on the initial screen). Further, for example, the icon layout template information can include a serial number of a layer where each icon corresponding to each icon name is arranged. Further, for example, the icon layout template information can include both the serial number of the layer arranged with each icon and the coordinate value of each icon corresponding to each icon name arranged on the layer.

Further, a plurality of icon layout template information can be stored in the icon layout template storage unit 110. The icon layout template information includes, for example, the icon layout template information having a template name of "Classic UI Template," and the icon layout template information of having a template name of "Simple UI Template" as illustrated in FIG. 9. For example, Classic UI Template is a template for arranging icons set for utilizing applications implementing a printing function or a scanning function, provided by standard UIs. For example, Simple UI Template is a template for arranging icons set for utilizing applications implementing a printing function or a scanning function, provided by simple UIs.

Further, the icon layout template information includes, for example, one icon layout template information having a template name of "Educational Application Template," and another icon layout template information having a template name of "Application Template for Retail" as illustrated in FIG. 9. For example, the icon layout template info, illation having the template name of "Educational Application Template" is a template for arranging icons set for utilizing educational applications (e.g., applications that provide functions specialized in printing teaching materials). For example, the icon layout template information having the template name of "Application Template for Retail" is a template for arranging icons set for utilizing retail applications (e.g., applications that provide functions specialized in printing promotional flyers).

The icon layout template information stored in the icon layout template storage unit 110 can be created in advance, for example, by the manufacturer of the image forming apparatus 20. Further, the icon layout template information created by the sales vendor and/or customer of the image forming apparatus 20 can be added to the icon layout template storage unit 110.

The description is returned to FIG. 10. After step S201, the icon layout analysis unit 103 analyzes the screen configuration information, acquired by the screen configuration acquiring unit 101 in step S103 or S105 (FIG. 6) to acquire the icon layout information from the screen configuration information (step S202).

Hereinafter, a description is given of an example of the icon layout information acquired by the icon layout analysis unit 103 from the screen configuration information with reference to FIG. 12. FIG. 12 illustrates an example of the icon layout information included in the screen configuration information.

As illustrated in FIG. 12, the icon layout information includes, for example, the display status indicating whether to display (arrange) or not to display (not to arrange) each icon name of each icon set for utilizing each application installed on the operation unit 21 of the image forming apparatus 20 on the initial screen.

For example, as illustrated in FIG. 12, the icon layout information includes, for example, the icon name of "Address Management" set with the display status of "non-display." This indicates that the icon corresponding to the icon name of "Address Management" is not displayed (not arranged) on the initial screen based on the screen configuration information including the icon layout information. Similarly, as illustrated in FIG. 12, the icon layout template information includes, for example, the icon name of "Copier (Classic)" set with the display status of "non-display."

Further, as illustrated in FIG. 12, the icon layout information includes, for example, the icon name of "Document Server" set with the display status of "display." This indicates that the icon corresponding to the icon name of "Document Server" is displayed (arranged) on the initial screen based on the screen configuration information including the icon layout information.

Similarly, as illustrated in FIG. 12, the icon layout information includes, for example, the icon name of "Fax (Classic)" set with the display status of "non-display," the icon name of "Printer (Classic)" set with the display status of "display," and the icon name of "Simple Copy" set with the display status of "display." Similarly, as illustrated in FIG. 12, the icon layout info, illation includes, for example, the icon name of "Simple Fax" set with the display status of "display," and the icon name of "Simple Scanner" set with the display status of "display." Similarly, as illustrated in FIG. 12, the icon layout information includes, for example, the icon name of "Scanner (Classic)" set with the display status of "non-display," and the icon name of "Web Browser" set with the display status of "display."

The description is returned to FIG. 10. After step S202, the icon layout editing unit 104 displays, for example, an icon layout comparison screen G200 illustrated in FIG. 13 based on the icon layout template information acquired by the template acquiring unit 102 and the icon layout information acquired by the icon layout analysis unit 103 (step S203).

As illustrated in FIG. 13, the icon layout comparison screen G200 includes, for example, a comparison area G210 for comparing the layout state or status of icons (e.g., display or non-display of icons) corresponding to the icon layout information acquired by the icon layout analysis unit 103, and the layout state or status of icons (e.g., display or non-display of icons) defined by the icon layout template information acquired by the template acquiring unit 102. The layout state or status of icons (e.g., display or non-display of icons) corresponding to the icon layout information is displayed in the "Before" column while the layout state or status of icons (e.g., display or non-display of icons) defined by the icon layout template information is displayed in the "After" column. With this configuration, the user can compare the icon names of the icons arranged on the current initial screen of the image forming apparatus 20 ("Before" in FIG. 13) and the icon names of the icons to be arranged on the initial screen if the icon layout template information is applied ("After" in FIG. 13).

The description is returned to FIG. 10. After step S203, the icon layout editing unit 104 determines whether the user inputs an instruction of changing the layout state or status of icons defined by the icon layout template information (step S204).

Figure 14:
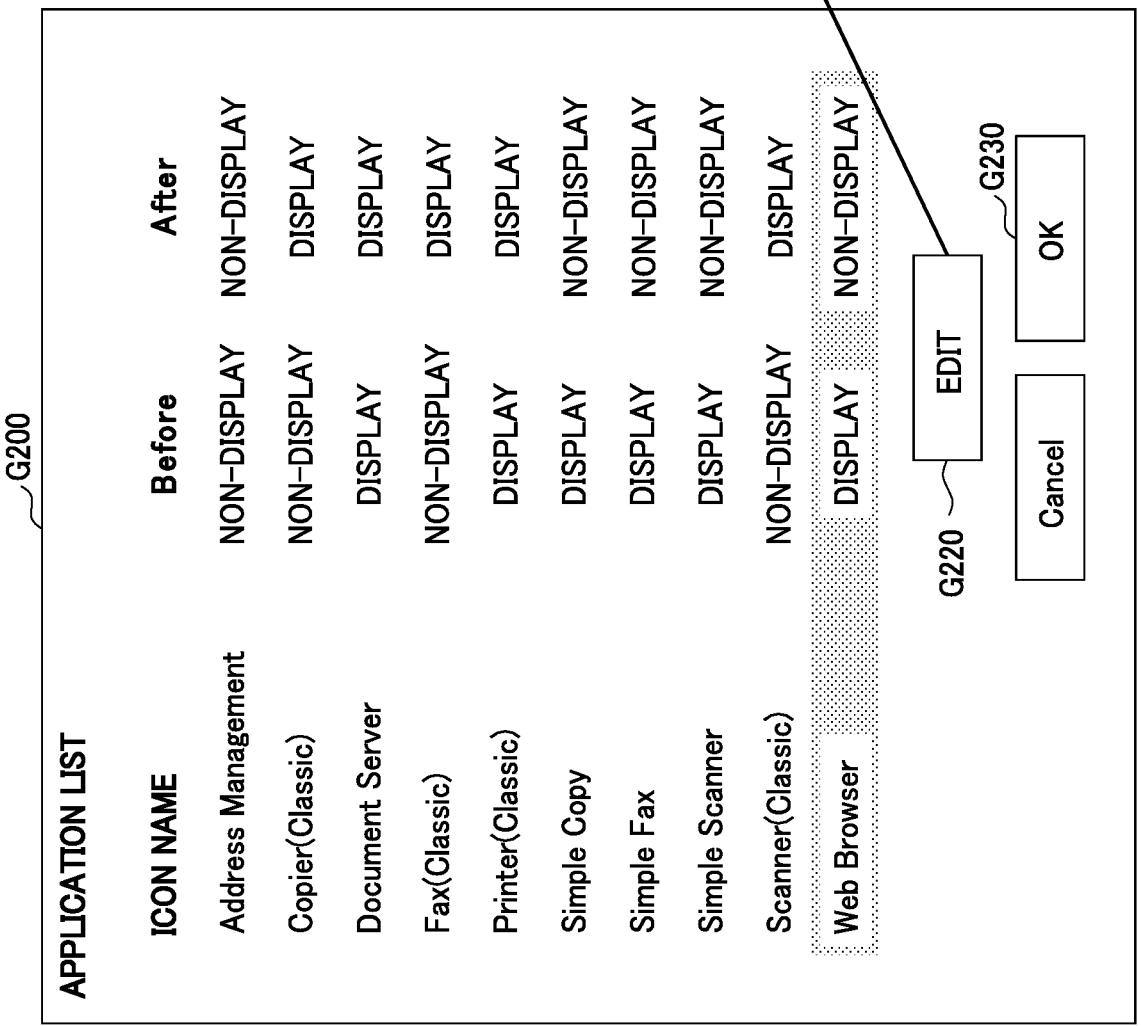
FIG. 14 illustrates an example of an icon layout comparison screen used for changing an icon layout by applying an icon layout template information.

Specifically, the user can instruct the change of the layout state or status of icons defined by the icon layout template information as follows. As illustrated in FIG. 14, the user selects a specific icon name from the comparison area G21 of the icon layout comparison screen G202 (see shaded portion in FIG. 14), and then presses an edit button G220. In an example case of FIG. 14, the icon name of "Web Browser" is selected, and then the edit button G220 is pressed.

Then, in response to the pressing the edit button G220, a display screen G300 including a change field G310 is displayed, and then the user can change the layout state or status (e.g., display or non-display) of the selected icon, and presses the OK button G320. Specifically, the layout state or status of icon defined by the icon layout template information sets the display status of "non-display" for the icon name of "Web Browser." Therefore, if the user wants to change the display status of the icon name of "Web Browser," the user can change or edit the display status of the icon name of "Web Browser" from "non-display" to "display" in the change field G310, and then press the OK button G320 to execute the change instruction.

By performing the above described change operation, the user can instruct to change the layout state or status of the icon defined by the icon layout template information. If the user wants to end the change of the layout state or status of the icon defined by the icon layout template information, the user can press an OK button 230 on the icon layout comparison screen G200. On the other hand, if the user wants to change the layout state or status of icons corresponding to a plurality of icon names, the user can instruct the change of layout state of each icon that the user wants to change the display status.

Further, the layout state or status of the icon defined by the icon layout template information can be set for one or more icons, which are prohibited to change the layout even if the change instruction of the user is input (that is, the editing of the layout state of a specific icon by the icon layout editing unit 104 is prohibited). For example, if the icon prohibited for changing the layout exists, it can be configured that the icon name of the concerned icon is not selectable by the user from the comparison area G210, or a warning indicating that the user is selecting the editing-prohibited icon name can be displayed. In this case, for example, the icon layout template information may include a segment for each icon name indicating whether the change instruction for each icon name is allowed or not. With this configuration, for example, a situation that the icon of the application constantly used by the user being set with "non-display" can be prevented.

If the user inputs the instruction to change the layout state or status of the icon defined by the icon layout template information (step S204: YES), the icon layout editing unit 104 edits the icon layout template information acquired by the template acquiring unit 102 (step S205). That is, for example, when the user inputs the change instruction indicating that the icon name of "Web Browser" icon is to be changed from "non-display" to "display," the icon layout editing unit 104 edits the display status of the icon name of "Web Browser" included in the icon layout template information from "non-display" to "display."

On the other hand, if the input of the instruction to change the layout state or status of the icon defined by the icon layout template information is ended (step S202: NO), the screen configuration changing unit 106 changes the icon layout information included in the screen configuration information acquired by the screen configuration acquiring unit 101 by applying the icon layout template information edited by the icon layout editing unit 104 (step S206).

Hereinafter, a description is given of an example of the icon layout information when the layout state or status of the icon name of "Web Browser" is changed from "non-display" to "display" on the icon layout comparison screen G202 by inputting the change instruction with reference to FIG. 15. As illustrated in FIG. 15, the screen configuration changing unit 106 changes the icon layout information illustrated in FIG. 12 by applying the icon layout template information illustrated in FIG. 11, which is edited in accordance with the change instruction.

By changing at least a part of the display status defined in the icon layout template information, the icon layout information included in the screen configuration information can be changed by applying the icon layout template information that is edited by changing the display status of at least a part of display elements (e.g., icons) included in the icon layout template information.

In the embodiment, the icon layout information included in the screen configuration information is changed based on the icon layout template information edited in response to the change instruction of the user, but not limited thereto. For example, the icon layout information included in the screen configuration information can be changed by applying the icon layout template information (not edited), and then the changed icon layout information can be edited in accordance with the change instruction of the user.

After step S206, the screen configuration transmission unit 107 determines whether an IP address of the transmission destination is input, to which the screen configuration information changed by the screen configuration changing unit 106 is to be transmitted (step S207). For example, the screen configuration transmission unit 107 displays a screen for inputting the IP address of the transmission destination, and then receives the input of the IP address designated by the user on the screen.

If the IP address of the transmission destination is input (step S207: YES), the screen configuration transmission unit 107 transmits the screen configuration information changed by the screen configuration changing unit 106 to the image forming apparatus 20 identified by the IP address of the transmission destination (step S208). When the screen configuration writing unit 203 of the image forming apparatus 20 receives the screen configuration information, the screen configuration writing unit 203 stores the screen configuration information in the screen configuration storage unit 204. At this timing, the screen configuration writing unit 203 can overwrite the original or current screen configuration information with the received screen configuration information.

Further, step S208 can be repeated for a plurality of times. That is, the same screen configuration information can be transmitted to a plurality of image forming apparatuses 20. With this configuration, the same screen configuration information can be applied to the plurality of image forming apparatuses 20, respectively.

On the other hand, if the input of the IP address of the transmission destination is ended (step S207: NO), the screen configuration saving unit 108 determines whether a saving instruction of the screen configuration information, changed by the screen configuration changing unit 106, is input (step S209).

If the saving instruction of the screen configuration information is input (step S209: YES), the screen configuration saving unit 108 saves the screen configuration information, changed by the screen configuration changing unit 106, in the screen configuration storage unit 109 (step S210). At this timing, the screen configuration saving unit 108 can overwrite the original or current screen configuration information with the screen configuration information changed by the screen configuration changing unit 106. Further, if a name is given to save the screen configuration information, the screen configuration saving unit 108 stores the screen configuration information changed by the screen configuration changing unit 106 in the screen configuration storage unit 109 in association with the name input by the user.

Further, the screen configuration information stored in the screen configuration storage unit 109 becomes a candidate of the screen configuration information to be selected by the user in steps S104 and S105 during the next time operation. Further, based on the screen configuration information stored in the screen configuration storage unit 109, the screen configuration information related to another image forming apparatus 20 can be generated.

Figure 16A:
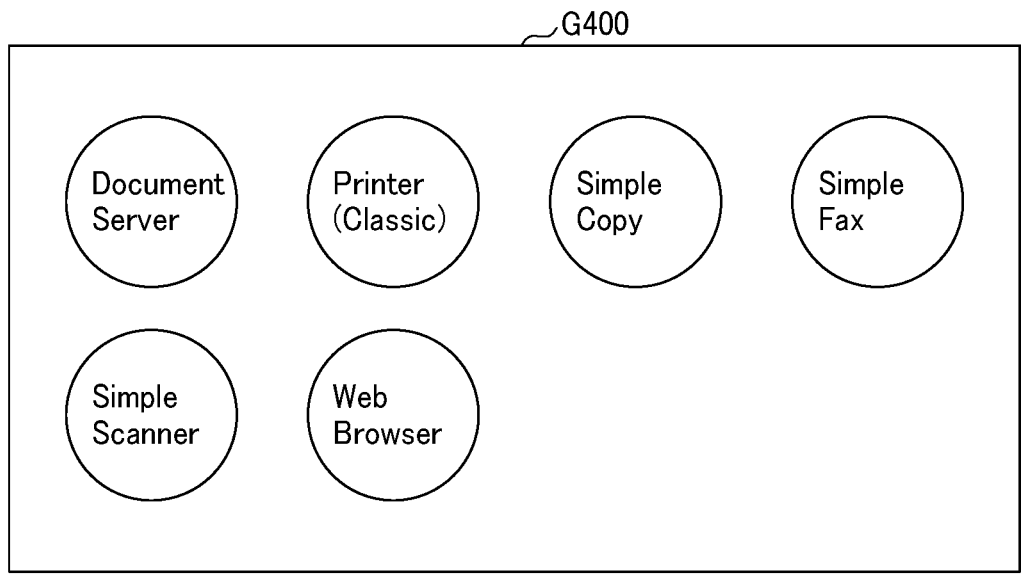
FIG. 16A illustrates an example of an icon layout before changing screen configuration information.

FIG. 16 illustrates an example of a layout state of icons on the initial screen before and after changing the screen configuration information. FIG. 16A illustrates an example of an initial screen G400, which is displayed based on the screen configuration information before the screen configuration information is changed in accordance with the edited icon layout template information. In an example of FIG. 16A, the initial screen G400 displays an icon having an icon name of "Document Server," an icon having an icon name of "Printer (Classic)," and an icon having an icon name of "Simple Copy." As illustrated in FIG. 16A, the initial screen G400 also displays an icon having an icon name of "Simple Fax," an icon having an icon name of "Simple Scanner," and an icon having an icon name of "Web Browser."

Figure 16B:
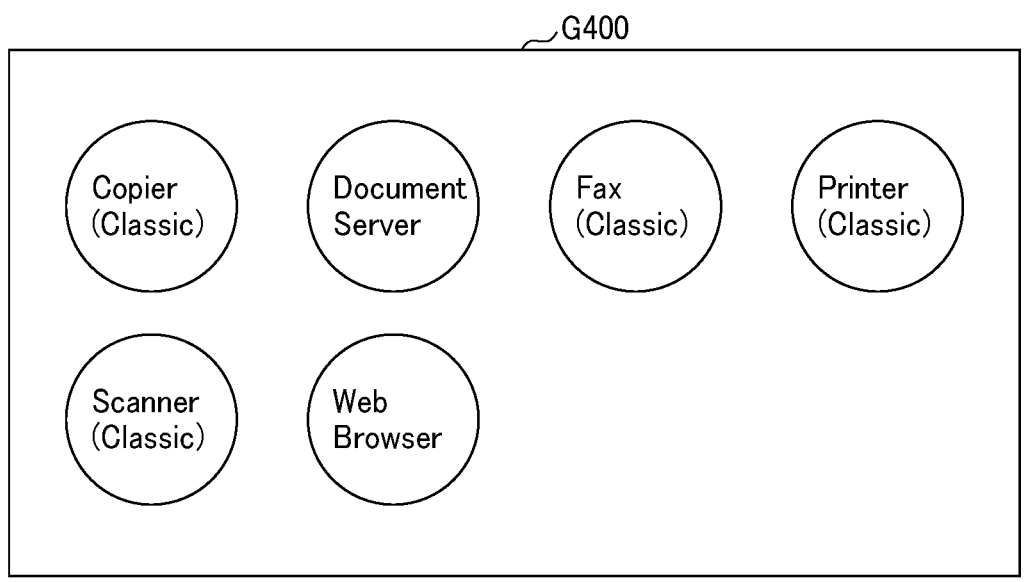
FIG. 16B illustrates an example of an icon layout after changing screen configuration information.

On the other hand, FIG. 16B is an example of the initial screen G400, which is displayed based on the screen configuration information after the screen configuration information is changed in accordance with the edited icon layout template information. In an example of FIG. 16B, the initial screen G400 displays the icons by changing the layout state of a part of the icons (e.g., the layout state or status of icon having an icon name of "Web Browser) among the icon layout state or status (e.g., display or non-display) defined by the icon layout template information illustrated in FIG. 11.

That is, as illustrated in FIG. 16B, the initial screen G400 displays an icon having an icon name of "Copier (Classic)," an icon having an icon name of "Document Server," and an icon having an icon name of "Fax (Classic)." In addition, as illustrated in FIG. 16B, the initial screen G400 displays an icon having an icon name of "Printer (Classic)," an icon having an icon name of "Scanner (Classic)," and an icon having an icon name of "Web Browser" based on the screen configuration information that is changed in accordance with the edited icon layout template information.

As described above, when the user terminal 10 is used to change the screen configuration information using the icon layout template information, the user terminal 10 can create the screen configuration information by changing or editing the layout state or status of a part of the icons defined by the icon layout template information. In other words, when the user terminal 10 is used to change the configuration of the initial screen using the icon layout template information, the user terminal 10 can change the configuration of the initial screen after changing the layout state or status of a part of the icons defined by the icon layout template information.

With this configuration, the user terminal 10 can easily change the screen configuration information using the icon layout template information, and can flexibly change the layout state or status of a part of the icons defined by the icon layout template information.

Figure 17:
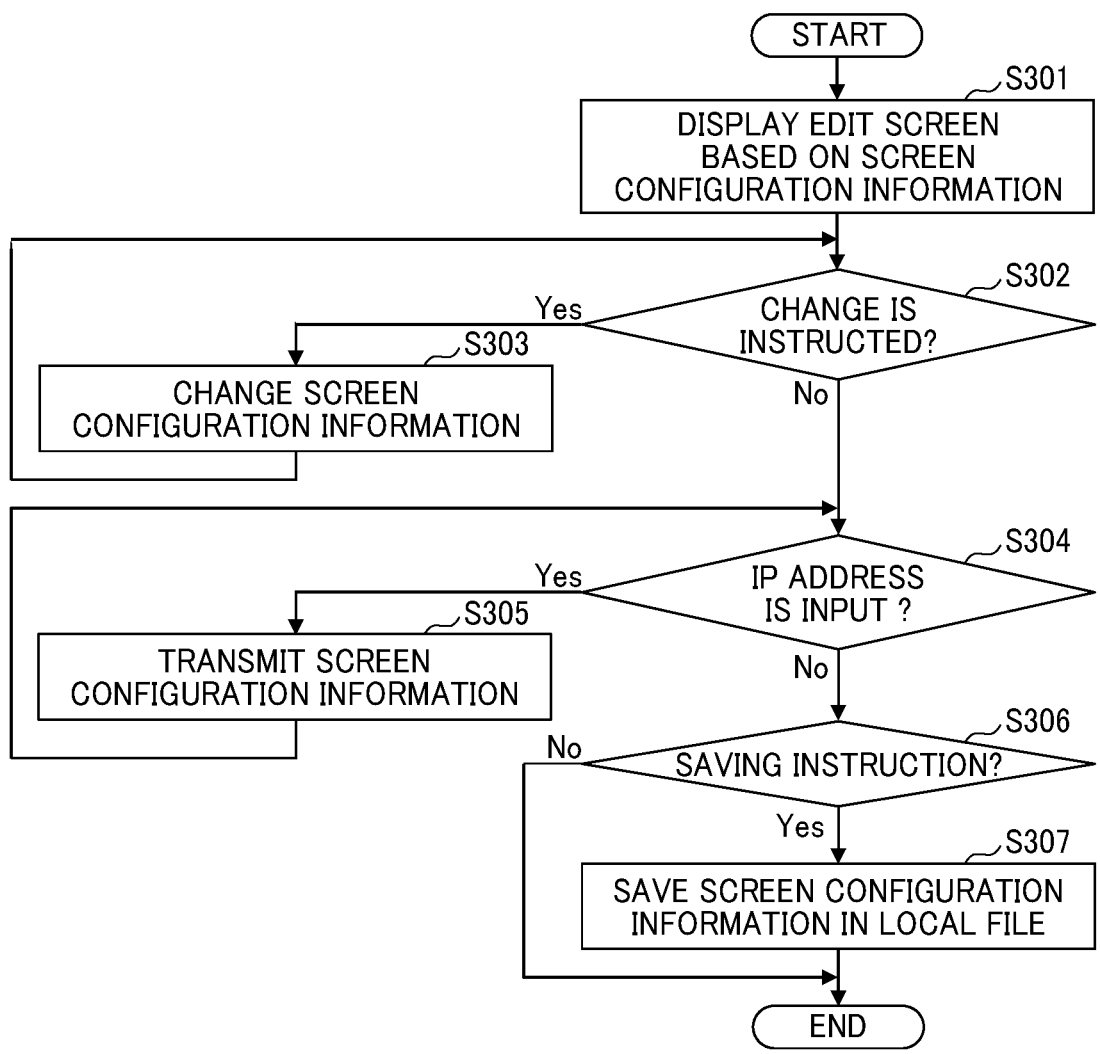
FIG. 17 is an example of a flow chart illustrating the steps of a process of changing screen configuration information without using icon layout template information.

Hereinafter, a description is given of the processing in step S108 (process of changing the screen configuration information without using the icon layout template information) with reference to FIG. 17. FIG. 17 is an example of a flow chart illustrating the steps of a process of changing the screen configuration information without using the icon layout template information.

At first, as illustrated in FIG. 18, the screen reproduction unit 105 displays, for example, an edit screen including the initial screen based on the screen configuration information acquired by the screen configuration acquiring unit 101 (step S301).

As illustrated in FIG. 18, the edit screen includes, for example, a display area G510, and a menu area G520. The display area. G510 is an area where the initial screen G400 is reproduced based on the screen configuration information. That is, the display area G510 displays the initial screen G400 in the same manner that the initial screen G400 is displayed on the operation panel 35 of the image forming apparatus 20. The menu area G520 is an area where various menus are displayed.

For example, by dragging one icon on the initial screen G400 included in the display area G510, a user can instruct to change a position of the one icon. At this timing, if another icon exists at the position where the one icon is dragged to by the user, the layout position of the dragged one icon and the layout position of another icon are exchanged. Further, by pressing a "delete" key while one icon is being selected, the user can instruct to change the display status of the one icon from the "display" to the "non-display."

Then, the screen reproduction unit 105 determines whether the change instruction regarding the configuration of the initial screen G400 is input by the user (step S302).

If the user inputs the change instruction of the configuration of the initial screen G400 (step S302: YES), the screen configuration changing unit 106 applies a change corresponding to the change instruction to the screen configuration information acquired by the screen configuration acquiring unit 101 (step S303). With this configuration, the screen configuration information is changed in accordance with the change instruction input by the user.

On the other hand, if the change instruction of the configuration of the initial screen G400 is ended (step S302: NO), steps S304 to S307 are performed. Since steps S304 to S307 are similar to steps S207 to S210 in FIG. 10, the description thereof is omitted.

As described above, the user terminal 10 can also change the screen configuration information without using the icon layout template information.

In the above described embodiment, when the configuration of the initial screen is to be set differently for each user, the screen configuration information can be stored in the screen configuration storage unit 109 or the screen configuration storage unit 204 in association with identification information (e.g., user ID) of each user. Alternatively, for example, a user ID can be included in the screen configuration information. In this case, the user ID can be designated together with the acquisition destination of the screen configuration information when starting the sequence of FIG. 6. Then, the screen configuration acquiring unit 101 can acquire the screen configuration information corresponding to the designated user ID.

As to the above described embodiment, the configuration of screen information or contents displayed on the apparatus can be flexibly changed by using the template information.

Numerous additional modifications and variations are possible in light of the above teachings. It is therefore to be understood that, within the scope of the appended claims, the disclosure of this patent specification may be practiced otherwise than as specifically described herein. Any one of the above-described operations may be performed in various other ways, for example, in an order different from the one described above.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An information processing apparatus comprising:
   circuitry configured to
   acquire configuration information of a screen displayable on a partner apparatus connectable with the information processing apparatus via a network, the configuration information including a value indicative of a number of screen layers, a single value indicative of a number of rows of display elements displayable in each of the screen layers, and a value indicative of a number of columns of display elements displayable in each of the screen layers;

acquire layout information indicating a layout state of one or more of the display elements arrangeable on the screen from the acquired configuration information;

acquire layout template information defining the layout state of the one or more of the display elements;

edit the layout state of at least a part of the one or more of the display elements defined in the acquired layout template information to generate edited layout template information; and change the acquired layout information based on the edited layout template information, wherein each of the screen layers is displayable on the information processing apparatus, and each of the layers is configured to be shifted through a sliding operation from left-to-right or a sliding operation from top-to-bottom.

2. The information processing apparatus according to claim 1, further comprising a memory configured to store the layout template information including a plurality of layout template information, wherein the circuitry acquires at least one of the layout template information selected by a user or at least one of the layout template information corresponding to the acquired layout information from the plurality of layout template information stored in the memory.

3. The information processing apparatus according to claim 1, wherein the circuitry edits the layout state of a part of the one or more of the display elements defined in the acquired layout template information in accordance with a change instruction input to the information processing apparatus, wherein the circuitry changes the acquired layout information based on the edited layout template information.

4. The information processing apparatus according to claim 3, wherein the layout template information includes a segment indicating whether a change in accordance with the change instruction input to the information processing apparatus is allowed or not for each of the display elements, wherein when the change instruction is input for changing the layout state of a specific display element that is not allowed to change the layout, the circuitry does not change the layout state of the specific display element defined in the layout template information.

5. The information processing apparatus according to claim 1, wherein the circuitry transmits the changed layout information to the partner apparatus including one or more partner apparatuses connected via the network.

6. The information processing apparatus of claim 1, wherein when the partner apparatus is an image processing apparatus installed with a plurality of applications, connectable with the information processing apparatus via the network, the circuitry is configured to acquire icon layout information indicating whether each one of icons, respectively corresponding to one of the plurality of applications, is to be displayed or not on an operation panel of the image processing apparatus;

acquire icon layout definition information defining which icon is to be displayed or not;

display the acquired icon layout information and the acquired icon layout definition information;

edit the acquired icon layout definition information to set which icon is to be displayed or not; and transmit a result of editing the icon layout definition information to the image processing apparatus.

7. The information processing apparatus of claim 1, wherein the configuration information defines a number of screen layers in an horizontal direction and a number of screen layers in a vertical direction.

8. The information processing apparatus of claim 1, wherein the partner apparatus is a multifunctional peripheral (MFP) device.

9. The information processing apparatus of claim wherein the network is a wireless network.

10. The information processing apparatus of claim 1, wherein the network is a wired local area network (LAN).

11. The information processing apparatus of claim 1, wherein the network includes the Internet.

12. The information processing apparatus of claim 1, wherein the configuration information includes an initial screen including a list of selectable templates, each of the selectable templates including templates to arrange the displayable elements.

13. The information processing apparatus of claim 1, wherein the configuration information includes a screen to receive selection of displayable elements to be displayed and displayable elements to not be displayed.

14. The information processing apparatus of claim 1, wherein the configuration information includes a screen that displays a status of each of the displayable elements.

15. The information processing apparatus of claim 1, wherein the displayable elements are icons.

16. The information processing apparatus of claim 1, wherein the number of screen layers is greater than one.

17. The information processing apparatus of claim 1, wherein each of the screen layers includes a plurality of icons corresponding to functions of the information processing apparatus, the functions including a scan function and a print function.

18. The information processing apparatus of claim 1, wherein a screen layer including at least an icon corresponding to a print function and an icon corresponding to a scan function are changed to a different layer based on receipt of a template by the information processing apparatus, and the different layer includes icons indicating different applications including a Copier (Classic) icon, a Printer (Classic) icon, and a Simple Copy icon, the different applications using a same forming function of the information processing apparatus.

19. An information processing system including a partner apparatus and an information processing apparatus connectable to the partner apparatus via a network, comprising:

circuitry configured to acquire configuration information of a screen displayable on the partner apparatus connected via the network, the configuration information including a value indicative of a number of screen layers, a single value indicative of a number of rows of display elements displayable in each of the screen layers, and a value indicative of a number of columns of display elements displayable in each of the screen layers;

acquire layout information indicating a layout state of one or more of the display elements arrangeable on the screen from the acquired configuration information;

acquire layout template information defining the layout state of the one or more of the display elements;

edit the layout state of at least a part of the one or more of the display elements defined in the acquired layout template information to generate edited layout template information; and change the acquired layout information based on the edited layout template information, wherein each of the screen layers is displayable on the information processing apparatus, and each of the layers is configured to be shifted through a sliding operation from left-to-right or a sliding operation from top-to-bottom.

20. A method of processing information displayable on a screen of an apparatus connectable via a network, comprising:

acquiring configuration information of the screen from the apparatus connected via the network, the configuration information including a value indicative of a number of screen layers, a single value indicative of a number of rows of display elements displayable in each of the screen layers, and a value indicative of a number of columns of display elements displayable in each of the screen layers;

acquiring layout information indicating a layout state of each of one or more of the display elements arrangeable on the screen of the apparatus from the acquired configuration information;

acquiring layout template information defining the layout state of each of the one or more of the display elements;

editing the layout state of at least a part of the one or more of the display elements defined in the acquired layout template information to generate edited layout template information; and changing the acquired layout information based on the edited layout template information, wherein each of the screen layers is displayable on the information processing apparatus, and each of the layers is configured to be shifted through a sliding operation from left-to-right or a sliding operation from top-to-bottom.

* * * * *